R. BROTTON.
Wheel-Cultivator.

No. {2,231, 33,235.}

Patented Sept. 10, 1861.

UNITED STATES PATENT OFFICE.

RILEY BROTTON, OF OSKALOOSA, IOWA.

IMPROVEMENT IN CULTIVATORS.

Specification forming part of Letters Patent No. 33,235, dated September 10, 1861.

*To all whom it may concern:*

Be it known that I, RILEY BROTTON, of Oskaloosa, in the county of Mahaska and State of Iowa, have invented a new and Improved Cultivator; and I do hereby declare that the following is a full, clear, and exact description of the same, reference being had to the annexed drawings, forming part of this specification, in which—

Figure 1:
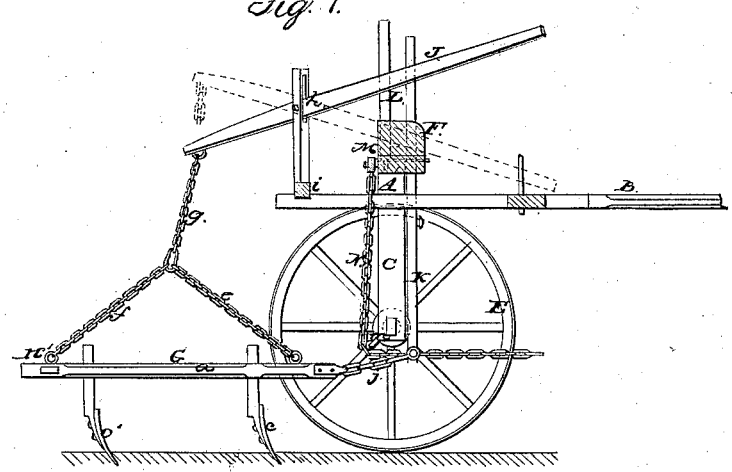
Figure 2:
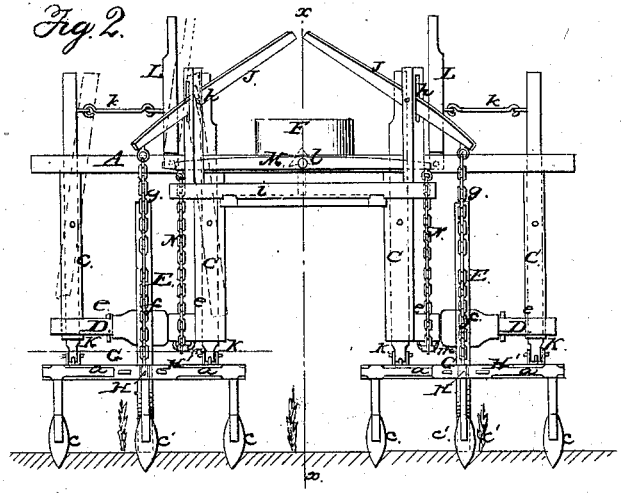
Figure 3:
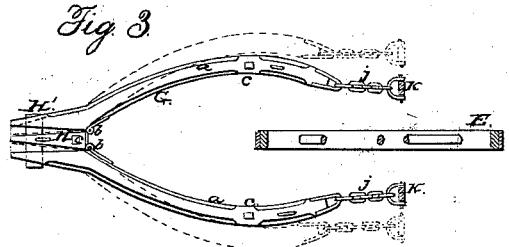

Figure 1 is a side sectional view of my invention, taken in the line $xx$, Fig. 2; Fig. 2, a back view of the same, and Fig. 3 a detached plan view of one of the cultivator-frames.

Similar letters of reference indicate corresponding parts in the several figures.

This invention relates to an improved cultivator for cultivating growing crops—those which are grown in hills or drills.

The object of the invention is to obtain a machine by which the work may be rapidly performed, and the parts placed under the complete control of the operator, both as regards the expanding and contracting of the parts to suit the width of the spaces between the rows, and also as regards the raising of the parts, so as to free the teeth or shares from the ground in moving or transporting the machine from place to place.

To enable those skilled in the art to fully understand and construct my invention, I will proceed to describe it.

A represents a bar or beam, to which a draft-pole, B, is attached at right angles; and C C C C are pendants secured to the bar or beam, the lower end of the pendants having horizontal bars or rods D attached, on each of which a wheel, E, is placed loosely. The wheels E E support the machine.

F is the driver's seat, which is at the center of the bar or beam A, and G G are two frames, each of which is formed of two curved bars, $a\ a$, connected at their back ends by joints $b\ b$ to short bars H. The bars H H have each a short horizontal bar, H', fitted in them, to serve as guides for the bars $a\ a$. The bars $a\ a$ have each a cultivator tooth or share, $c$, attached to it, and a tooth or share, $c'$, is attached to each bar H. These teeth or shares may be of the usual or any proper form. The frames G G are suspended to levers J J by means of rods $e\ e f g$, a rod, $e$, being attached to each bar $a$, and one, $f$, to the bar H of each frame G, the upper end of the rods $e\ e f$ being connected to the rod $g$, which is attached to the back end of a lever, J. The levers J J have their fulcra in uprights $h\ h$, which are attached to a cross-bar, $i$, at the back end of a draft-pole, B. The levers J J extend in front of the driver's seat F, so as to be within convenient reach of the driver. The front ends of the bars $a$ are connected by chains $j\ j$ to the lower ends of levers K, which have their fulcra in the pendants C. The levers K extend up through the bar or beam, and they are all within convenient reach of the driver, the outermost levers K being connected by links or rods $k$ to levers L near the seat F.

To the back side of the bar or beam A there is attached, by a central pin or bolt, $l$, a bar, M, and to each end of bar M a chain, N, is secured, said chains extending down and passing underneath rollers $m$ on the bars or rods D, and having whiffletrees attached to their front ends.

From the above description it will be seen that as the machine is drawn along, either or both frames G G may be raised, so that the teeth or shares $c$ will be above the surface of the ground, and it will also be seen that the bars $a\ a$ may be expanded or contracted by actuating the levers K. The frames G G, it will be understood, clean or operate upon two spaces at once, each frame G being in a space, and a row of plants directly under the driver's seat. The draft-pole B, being elevated, does not come in contact or at all interfere with the growing plants.

Having thus described my invention, what I claim as new, and desire to secure by Letters Patent, is—

The expanding toothed frames G G, constructed substantially as shown, connected to the mounted bar A through the medium of the levers K K, and attached to the elevating-levers J J by means of rods $e\ e f g$, all combined and arranged for joint operation, as and for the purpose set forth.

RILEY BROTTON.

Witnesses:
   CHAS. BEARDSLEY,
   I. RHINEHART.